United States Patent
Kumar et al.

(10) Patent No.: US 9,904,341 B2
(45) Date of Patent: Feb. 27, 2018

(54) CASCADING POWER CONSUMPTION

(75) Inventors: Arvind Kumar, Beaverton, OR (US);
Brian E. Woodruff, Tigard, OR (US);
David M. Putzolu, Hillsboro, OR (US);
Mark R. Walker, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 13/608,479

(22) Filed: Sep. 10, 2012

(65) Prior Publication Data
US 2014/0075211 A1    Mar. 13, 2014

(51) Int. Cl.
*G06F 1/26* (2006.01)
*G06F 1/32* (2006.01)
*H04W 52/02* (2009.01)

(52) U.S. Cl.
CPC ........... *G06F 1/266* (2013.01); *G06F 1/3206* (2013.01); *G06F 1/3234* (2013.01); *H04W 52/0229* (2013.01); *H04W 52/0254* (2013.01)

(58) Field of Classification Search
CPC .......... H04W 52/0229; H04W 52/0251; G06F 1/3231
USPC ................. 713/300, 320, 323, 324
See application file for complete search history.

(56) References Cited

U.S. PATENT DOCUMENTS

| | | | |
|---|---|---|---|
| 7,213,057 B2 | 5/2007 | Trethewey et al. | |
| 2005/0060377 A1 | 3/2005 | Lo et al. | |
| 2005/0060575 A1 | 3/2005 | Trethewey et al. | |
| 2005/0131715 A1 | 6/2005 | Trethewey | |
| 2005/0237347 A1* | 10/2005 | Yamaji | G01D 5/14 347/5 |
| 2007/0079030 A1 | 4/2007 | Okuley et al. | |
| 2007/0102525 A1* | 5/2007 | Orr et al. | 235/472.01 |
| 2007/0241888 A1* | 10/2007 | Mantovani | G08B 21/0202 340/539.13 |
| 2008/0152034 A1 | 6/2008 | Liu et al. | |
| 2010/0033424 A1* | 2/2010 | Kabasawa | G01C 17/28 345/156 |
| 2010/0313050 A1* | 12/2010 | Harrat et al. | 713/323 |
| 2011/0310005 A1* | 12/2011 | Chen et al. | 345/156 |
| 2012/0147531 A1* | 6/2012 | Rabii | 361/679.01 |
| 2012/0280917 A1* | 11/2012 | Toksvig et al. | 345/173 |

(Continued)

OTHER PUBLICATIONS

Needham, et al., "Orientation Sensing Computing Devices", PCT Patent Application No. PCT/US2012/030488, filed on Mar. 25, 2012, 29 pages.

(Continued)

*Primary Examiner* — Kim Ngoc Huynh
*Assistant Examiner* — Brandon Kinsey
(74) *Attorney, Agent, or Firm* — International IP Law Group, P.L.L.C.

(57) ABSTRACT

A method and system for cascading power consumption is described herein. The method may include providing power to a first sensor and a second sensor, wherein the first sensor consumes more power than the second sensor. The method may also include detecting the first sensor does not capture a sample of data. In addition, the method may include stopping the flow of power to the first sensor. Furthermore, the method may include monitoring an operating environment with the second sensor. The method may also include providing power to the first sensor in response to the second sensor detecting a sample of data.

18 Claims, 9 Drawing Sheets

(56) References Cited

U.S. PATENT DOCUMENTS

| | | | | |
|---|---|---|---|---|
| 2013/0017840 A1* | 1/2013 | Moeglein | ................ | G01S 19/25 |
| | | | | 455/456.1 |
| 2013/0104187 A1* | 4/2013 | Weidner | .................. | G06F 21/31 |
| | | | | 726/1 |
| 2013/0159749 A1* | 6/2013 | Moeglein et al. | ............ | 713/323 |
| 2014/0024392 A1* | 1/2014 | Su et al. | .................... | 455/456.2 |
| 2014/0025973 A1* | 1/2014 | Schillings et al. | ............ | 713/323 |

OTHER PUBLICATIONS

Trethewey, et al., "Providing Support for Device States", U.S. Appl. No. 13/608,683, mailed on Sep. 10, 2012, 30 pages.

Trethewey, et al., "Providing Support for Display Articulation Related Applications", U.S. Appl. No. 13/608,356, mailed on Sep. 10, 2012, 26 pages.

Trethewey, et al., "Providing Support for Position Related Applications", U.S. Appl. No. 13/608,159, filed Sep. 10, 2012, 30 pages.

Trethewey, et al., "Sensor and Context Based Adjustment of the Operation of a Network Controller", U.S. Appl. No. 13/608,419, field on Sep. 10, 2012, 31 pages.

* cited by examiner

CASCADING POWER CONSUMPTION

TECHNICAL FIELD

This disclosure relates generally to power consumption by a computing system and more specifically, but not exclusively, to cascading power consumption in a computing system.

BACKGROUND

Modern computing devices continue to incorporate a growing number of sensors. For example, modern computing devices may include sensors that can provide additional information to the computing device about the surrounding environment. In some examples, the sensors may include an accelerometer, a gyrometer, or a magnetometer. An accelerometer may detect the change in velocity of a computing device. In some embodiments, a gyrometer may detect the angular velocity of the computing device. A magnetometer may detect the direction the computing device is headed. As the number of sensors included in a computing system increases, the amount of power to operate the sensors also increases.

BRIEF DESCRIPTION OF DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION

According to embodiments of the subject matter disclosed herein, cascading power consumption can be implemented in a computing system. Cascading power consumption, as referred to herein, includes providing power to a sensor, a hardware device, or an application in response to an event. An event can include additional sensors receiving power, an application being executed, or additional sensors detecting a change in the operating environment, among others. For example, a computing system may cascade power consumption by sensors by providing power to a first sensor in response to a second sensor receiving power or a second sensor detecting any suitable change in the operating environment. A change in the operating environment may include a second sensor detecting input that exceeds a threshold. For example, an accelerometer may detect a change in the operating environment such as a change in the acceleration of a computing device that is beyond a predetermined threshold. While some sensors use a small amount of power, other sensors can consume a large amount of power. In current methods, the power consumed by sensors can be controlled by removing power to all of the sensors in response to certain events. For example, after a certain period of inactivity, a computing device may stop the flow of power to all sensors.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 1:
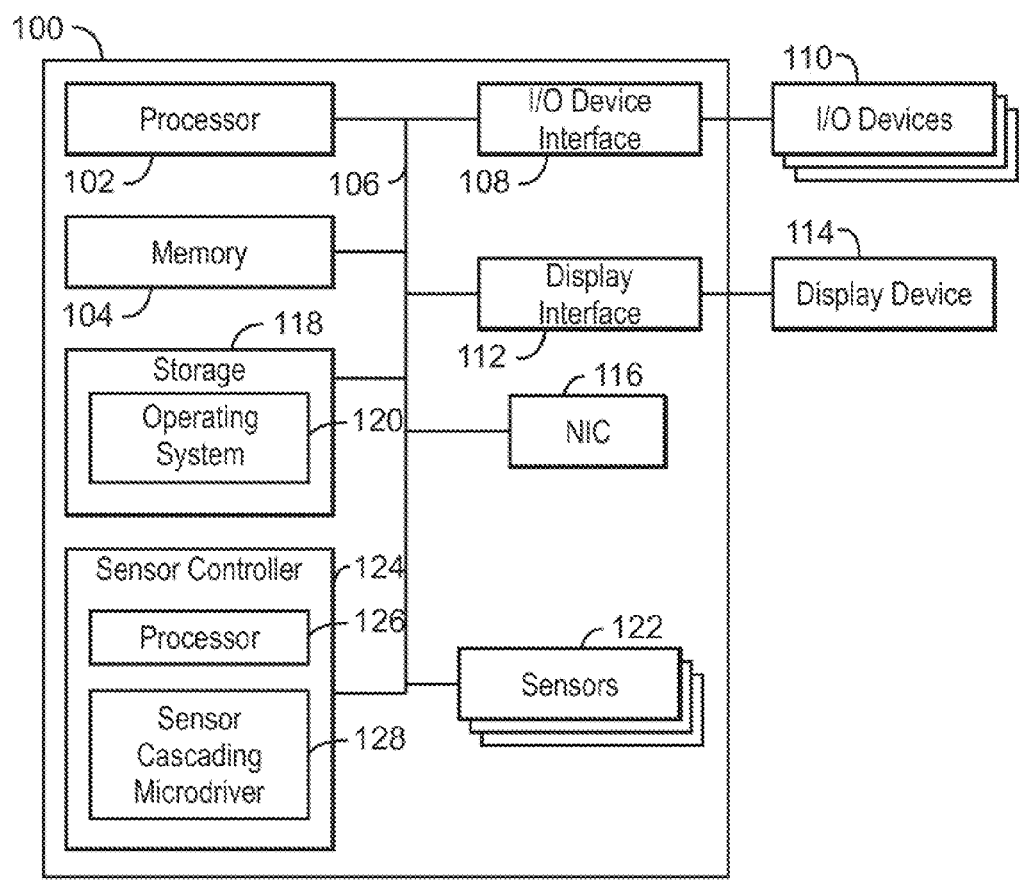
FIG. 1 is a block diagram of an example of a computing system used for cascading power consumption.

FIG. 1 is a block diagram of an example of a computing system used for cascading power consumption. The computing system 100 may be, for example, a mobile phone, laptop computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU). In some embodiments, the processor 102 includes dual-core processor(s), dual-core mobile processor(s), or the like.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store computer-readable instructions that, when executed by the processor, direct the processor to perform various operations in accordance with embodiments described herein. For example, the instructions that are executed by the processor 102 may be used to implement a method that includes cascading power consumption.

The processor 102 may be connected through a system bus 106 (e.g., PCI, ISA, PCI-Express, HyperTransport®, NuBus, etc.) to an input/output (I/O) device interface 108 adapted to connect the computing system 100 to one or more I/O devices 110. The I/O devices 110 may include, for example, a keyboard and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100. The processor 102 may also be linked through the system bus 106 to a network interface card (NIC) 116. The NIC 116 may be adapted to connect the computing system 100 through the system bus 106 to a network (not depicted). The network may be a wide area network (WAN), local area network (LAN), or the Internet, among others.

The computing device 100 may also include a storage device 118. The storage device 118 may include a physical memory such as a hard drive, an optical drive, a flash drive, an array of drives, or any combinations thereof. The storage device 118 may also include remote storage drives. The storage device 118 may also include an operating system 120. In some embodiments, the storage device 118 may store instructions thereon to cascade power consumption by sensors 122. In some embodiments, the operating system 120 may have installed thereon one or more drivers. The drivers enable a piece of hardware or an application installed on the operating system 120 to communicate with the operating system 120, applications, or other hardware of the computing device 100 including sensors 122. The drivers may also be used to enable a sensor controller hub 124 to communicate data from the sensors 122 to the application installed on the operating system 120, in accordance with some embodiments. In some embodiments, the drivers are installed on the memory device 104. The memory device 104 may include instructions used to cascade power consumption by sensors 122 in a similar manner as described in reference to the operating system 118 above.

The sensor hub controller 124 may include a co-processor 126. In some embodiments, the co-processor 126 is distinct from the processor 102 of the computing device 100. The sensor hub controller 124 may also include an additional memory or storage device with instructions thereon to provide data related to cascading power consumption for sensors 122 to the operating system 118. Additionally, the sensor hub controller 124 may include a sensor cascading microdriver 128 that can detect information from any suitable number of sensors and determine how to cascade power consumption by the sensors.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional sensors, additional sensor controllers, additional buses connecting the sensors 122 and the sensor controller 124, etc.). Furthermore, any of the functionalities of the sensor controller hub 124 may be partially, or entirely, implemented in hardware and/or in the processor 102. For example, the functionality may be implemented with an application specific integrated circuit, in a device orientation microdriver included in the sensor controller, in logic implemented in the processor 102, in a co-processor 126, or in any other device.

Figure 2A:
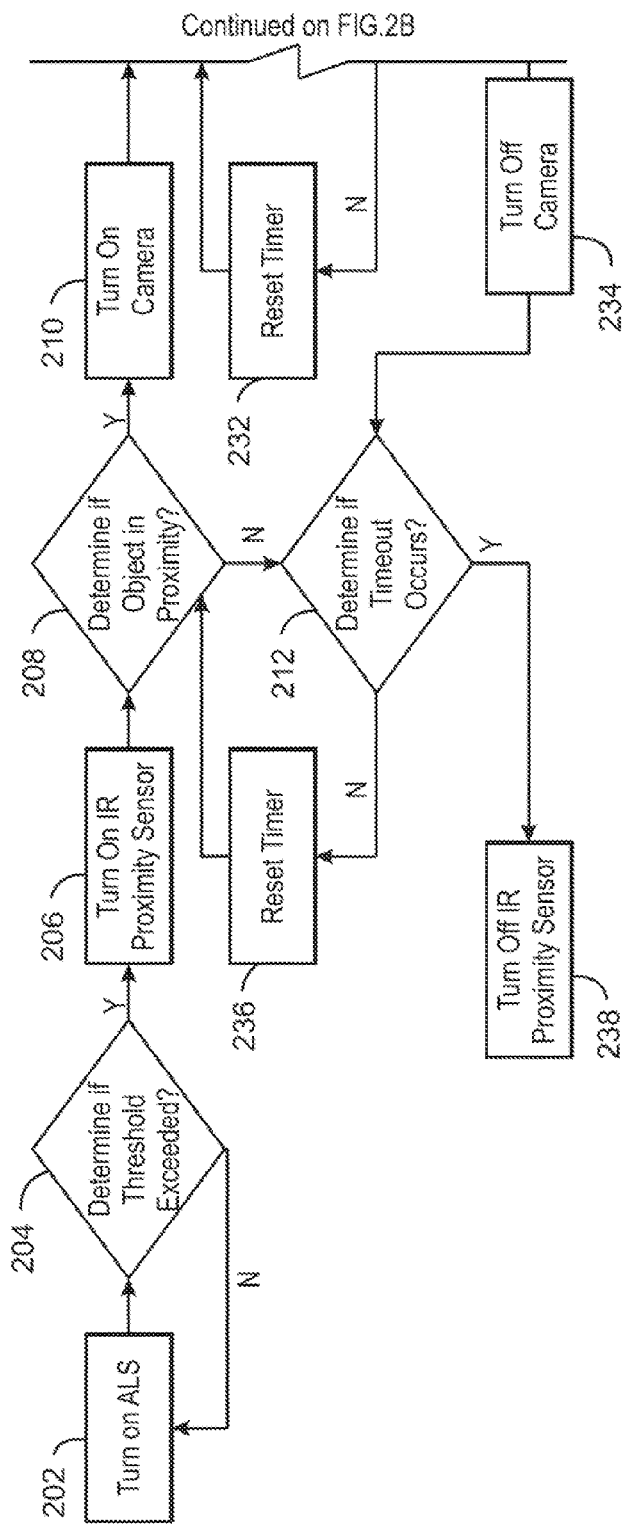
FIG. 2 is a process flow diagram for an example of cascading power consumption for an human proximity sensor, a camera, and facial recognition software.
Figure 2B:
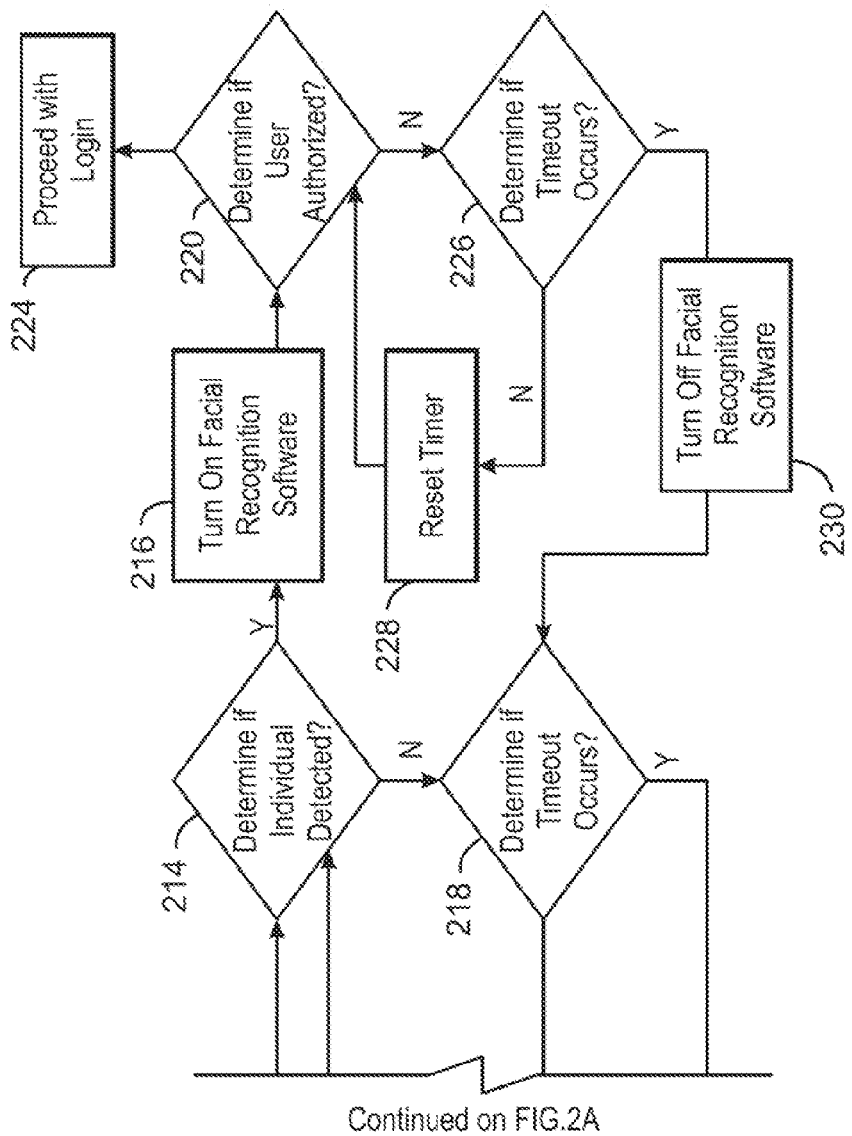

FIG. 2 is a process flow diagram for an example of cascading power consumption for a human proximity sensor, a camera, and facial recognition software. The method 200 for cascading power consumption can be implemented with a computing system, such as the computing system 100 of FIG. 1. As discussed above, cascading includes providing power to a sensor or application in response to an event. The method 200 can cascade power consumption by a computing system that includes a camera. In some embodiments, the computing system can use the camera to authenticate a user through facial recognition software.

At block 202, the sensor cascading microdriver 128 can turn on a sensor that detects the level of light in an operating environment. The light detecting sensor is also referred to herein as an Ambient Light Sensor (ALS). At block 204, the sensor cascading microdriver 128 determines if the level of light in the environment surrounding the computing system 100 is above a threshold. In some embodiments, the threshold can indicate whether there is sufficient light for a proximity sensor or a camera to detect a person in the operating environment of the computing system 100. The sensor cascading microdriver 128 may use the ALS to determine if the level of light in the surrounding operating environment is above or below a threshold. If the ALS detects a level of light below the threshold, the process flow returns to block 202. If the ALS detects a level of light above a threshold, the process flow continues at block 206.

At block 206, the sensor cascading microdriver 128 can provide power to a human proximity sensor (also referred to herein as an IR proximity sensor). The human proximity sensor can include infrared sensor, audio sound sensors, ultrasonic sensors, or magnetic interference sensors, among others. The IR proximity sensor can detect if an object is in close proximity to the computing system 100. At block 208, the sensor cascading microdriver 128 can use the IR proximity sensor to determine if an object is within a particular proximity of the computing system 100. For example, a threshold may indicate an object is within a particular distance of a camera in the computing system. If the sensor cascading microdriver 128 determines an object is within a particular proximity of the computing system, the process flow continues at block 210. If the sensor cascading microdriver 128 determines an object is not within a particular proximity of the computing system, the process flow continues at block 212.

At block 210, the sensor cascading microdriver 128 can provide power to a camera in the computing system 100. In some examples, a camera may consume more power than other hardware devices and sensors, so limiting the power to the camera can provide significant power savings for a computing system. In some embodiments, the sensor cascading microdriver 128 may determine that an object is within a close proximity to the computing system 100 and the camera may receive power to determine the type of object in close proximity to the computing system 100. At block 214, the sensor cascading microdriver 128 determines whether the object detected with the camera is a person using any suitable application that can utilize individual characteristics. To detect whether the object is a person, the sensor cascading microdriver 128 can execute any suitable application that uses individual characteristics gathered from a human proximity sensor. If the sensor cascading microdriver 128 determines that the object detected with the camera is a person, the process flow continues at block 216. If the sensor cascading microdriver 128 determines the object detected with the camera is not a person, the process flow continues at block 218.

At block 216, the sensor cascading microdriver 128 can send instructions to begin execution of facial recognition software. At block 220, the sensor cascading microdriver 128 may receive data from facial recognition software to determine if a user is authorized. For example, the face of a person in close proximity to the computing system may be compared to any suitable number of faces of authorized users. If the sensor cascading microdriver 128 determines a user is authorized, the process flow continues at block 224. At block 224, the user may proceed with login and the user can access any information that the user is authorized to view. If the sensor cascading microdriver 128 determines a user is not authorized, the process flow continues at block 226. At block 226, the sensor cascading microdriver 128 determines if a timeout occurs. In some examples, a timeout may indicate a user has not been authorized within a period of time. A timer may be used to determine if a timeout value is reached or exceeded. If input is detected by the sensor cascading microdriver 128 within a period of time specified as the timeout value, a timer can be reset at block 228 and the process can continue to determine if a user is authorized at block 220.

If the sensor cascading microdriver 128 determines a timeout has occurred, the process flow continues by stopping execution of facial recognition software at block 230. In some embodiments, execution of the facial recognition software may consume a significant amount of power. If the sensor cascading microdriver 128 stops execution of the facial recognition software in response to inactivity within the facial recognition software, the sensor cascading microdriver 128 can reduce the power consumption of a computing system.

After the sensor cascading microdriver 128 stops execution of the facial recognition software, the process flow continues at block 218. At block 218, the sensor cascading microdriver 128 can determine if another timeout value is reached or exceeded without detecting any input or activity from the camera. If the sensor cascading microdriver 128 detects activity or input from the camera, the timer can be reset at block 232 and the process can continue at block 214. If the sensor cascading microdriver 128 determines a timeout value for the camera has been exceeded, power can be turned off to the camera at block 234 to reduce power consumption of the computing system.

After the sensor cascading microdriver 128 stops power to the camera at block 234, the process flow continues at block 212. At block 212, the sensor cascading microdriver 128 determines if a timeout value has been exceeded for the IR proximity sensor. If the sensor cascading microdriver 128 detects activity or input from the IR proximity sensor, a timer can be reset at block 236 and the process can continue at block 208. If the sensor cascading microdriver 128 determines a timeout value for the IR proximity sensor has been exceeded, power can be turned off to the IR proximity sensor at block 238 to reduce power consumption of the computing system.

The process flow diagram of FIG. 2 is not intended to indicate that the steps of the method 200 are to be executed in any particular order, or that all of the steps of the method 200 are to be included in every case For example, the sensor cascading microdriver 128 may cascade power consumption through any suitable number of sensors or applications. Further, any number of additional steps may be included within the method 200, depending on the specific application.

Figure 3:
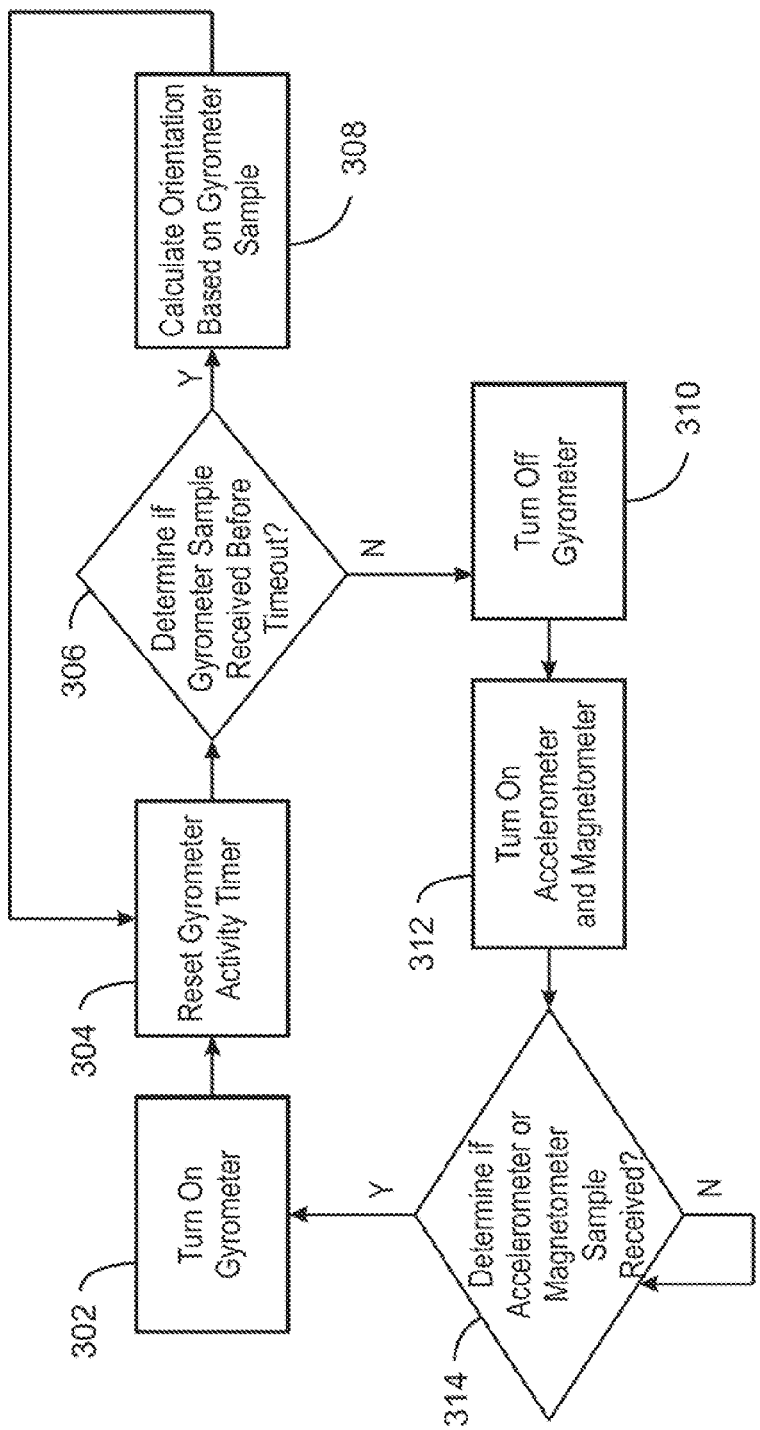
FIG. 3 is a process flow diagram of an example of cascading power consumption for a magnetometer, an accelerometer, and a gyrometer.

FIG. 3 is a process flow diagram of an example of cascading power consumption for a magnetometer, an accelerometer, and a gyrometer. The method 300 may be implemented with a computing system, such as the computing system 100 of FIG. 1.

At block 302, the sensor cascading microdriver 128 can provide power to a gyrometer. In some embodiments, a gyrometer may detect angular velocities of a computing device. The sensor cascading microdriver 128 can then reset a gyrometer activity timer at block 304. The gyrometer activity timer can indicate the gyrometer has detected any input within a period of time. In some embodiments, the gyrometer activity timer can be used as a timeout value. For example, the gyrometer activity timer can indicate a period of time during which the gyrometer has not detected any additional data.

At block 306, the device orientation microdriver 128 can determine if the gyrometer has received a sample of data before a timeout is received. A sample of data, as referred to herein, can include any data related to an environmental characteristic of a computing system. An environmental characteristic can include a change in velocity of the computing system, a change in tilt of the computing system, a change in direction of the computing system, a change in the light of the surrounding area, among others. In some embodiments, the sample of data can be any suitable data that can be detected by a gyrometer. For example, the sample of data may include an environmental characteristic related to the orientation of a computing system. If the sensor cascading microdriver 128 determines the gyrometer has received a sample of data before a timeout, the process flow continues at block 308. At block 308, the sensor cascading microdriver 128 can compute the orientation of a computing system based on the sample of data from the gyrometer. For example, the sample of data may indicate the tilt of a computing system in three dimensional space. In other embodiments, the sample of data may indicate the rotation of a computing system around a point or set of points in three dimensional space.

If the sensor cascading microdriver 128 determines the gyrometer has not received a sample of data before a timeout, the process flow continues at block 310. At block 310, the sensor cascading microdriver 128 can turn off the power to the gyrometer. As discussed above in relation to FIG. 2, turning off the power to a sensor such as the gyrometer during periods of inactivity can reduce the power consumption of the computing system.

At block 312, the sensor cascading microdriver 128 can turn on power to an accelerometer and a magnetometer. In some embodiments, the accelerometer and magnetometer may consume less power than the gyrometer. The sensor cascading microdriver 128 can use an accelerometer or magnetometer to detect input or activity. The sensor cascading microdriver 128 can turn on power to the gyrometer in response to any activity detected by the accelerometer or magnetometer. At block 314, the sensor cascading microdriver 128 can determine if an accelerometer or magnetometer receives a sample of data. The sample of data may include any suitable data that can be detected by the accelerometer or magnetometer. For example, the sample of data may include a change in acceleration of the computing device or a change in direction of the computing device. If the sensor cascading microdriver 128 determines a sample of data has been received, the process can return to block 302 and the gyrometer can receive power again.

The process flow diagram of FIG. 3 is not intended to indicate that the steps of the method 300 are to be executed in any particular order, or that all of the steps of the method 300 are to be included in every case. Further, any number of additional steps may be included within the method 300, depending on the specific application.

Figure 4A:
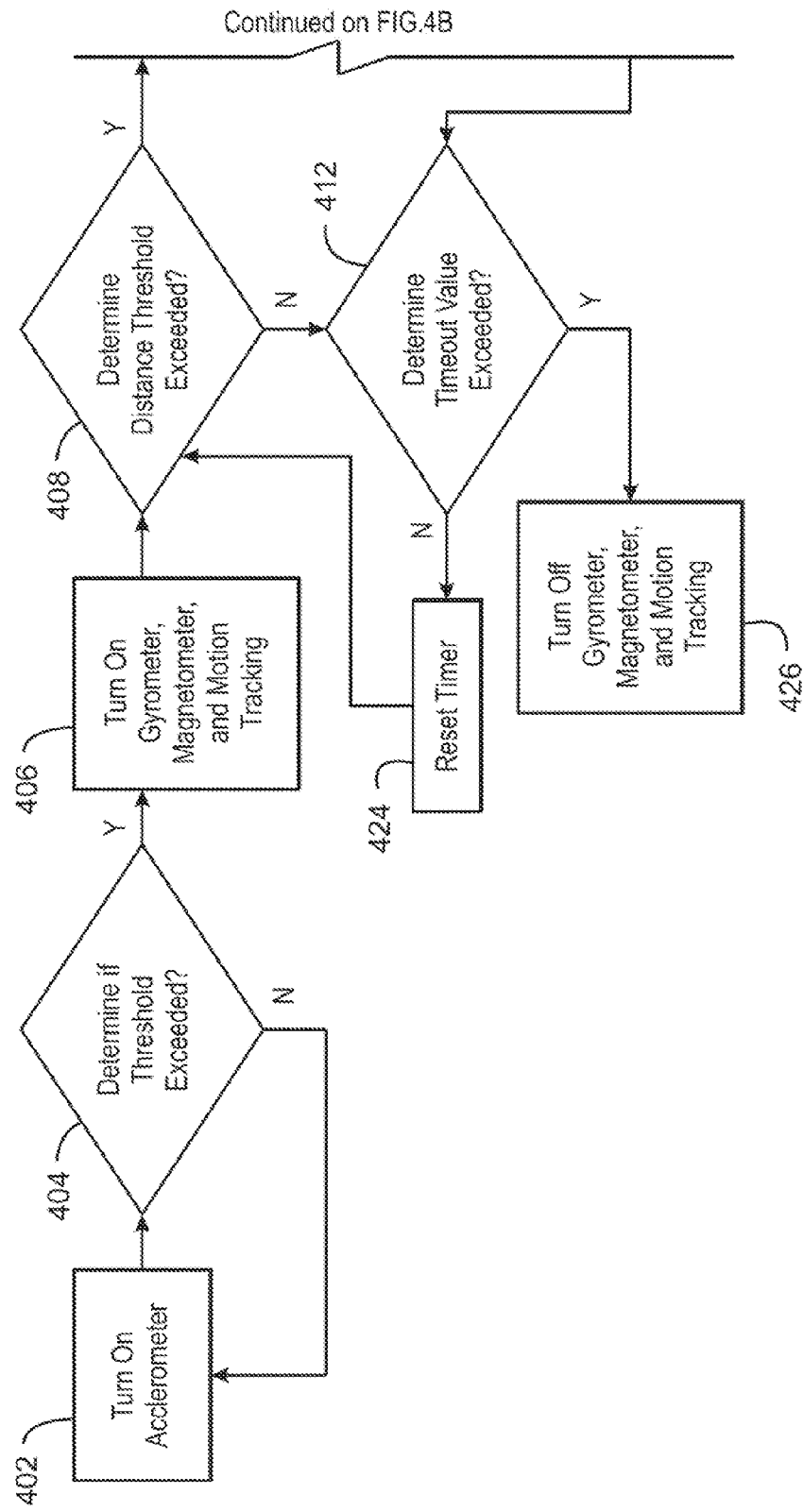
FIG. 4 is a process flow diagram for an example of cascading power consumption for a gyrometer, a magnetometer, and an accelerometer.
Figure 4B:
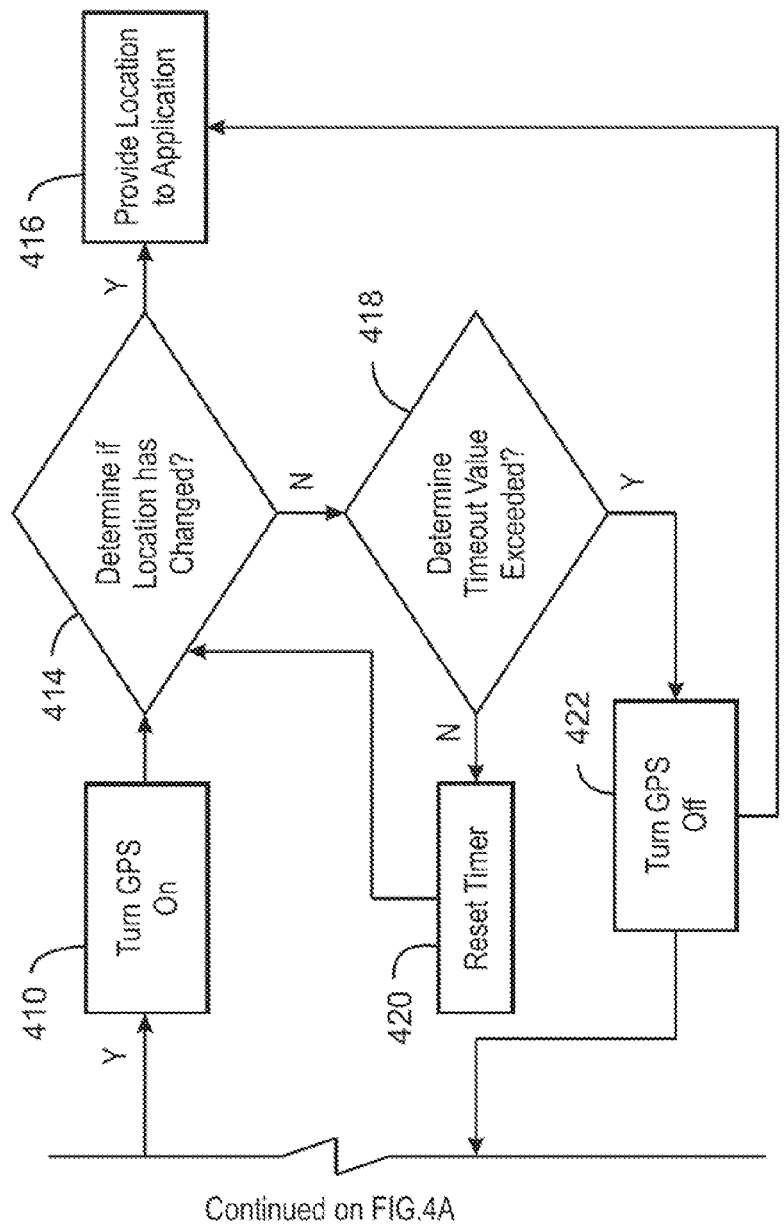

FIG. 4 is a process flow diagram for an example of cascading power consumption for a gyrometer, a magnetometer, and an accelerometer sensor. The method 400 may be implemented with a computing system, such as the computing system 100 of FIG. 1.

At block 402, the sensor cascading microdriver 128 can provide power to an accelerometer. In some embodiments, the accelerometer may consume less power than other sensors, such as a GPS sensor. The sensor cascading microdriver 128 can then determine if a threshold is exceeded. In some embodiments, the threshold can be determined by a change in the velocity of a computing system detected by the accelerometer. For example, the accelerometer may detect a certain change in the velocity before a predetermined threshold is reached. In some examples, the accelerometer can detect if a computing system starts to move in a vertical or horizontal direction. In some embodiments, a GPS sensor may detect a change in velocity of the computing system. If the sensor cascading microdriver 128 does not detect a threshold has been exceeded, the process returns to block 402. If the device determines a threshold has been exceeded, the process flow continues at block 406.

At block 406, the sensor cascading microdriver 128 provides power to a gyrometer, a magnetometer, and a motion tracking sensor. The combination of the gyrometer, magnetometer, and motion tracking sensor can detect the distance a computing system has travelled. The accelerometer, magnetometer, and gyrometer can enable the motion tracking sensor. In some examples, the motion tracking sensor can use techniques such as dead reckoning or pedestrian inertial navigation to determine a computing system has moved a certain distance in a certain direction. In some embodiments, a different combination of sensors may be used to detect the distance a computing system has travelled. For example, in embodiments, the distance travelled can be computed without the use of a magnetometer.

At block 408, the sensor cascading microdriver 128 determines if a threshold has been exceeded. In some embodiments, the threshold may correspond with the distance a computing system has travelled For example, the distance a computing system has travelled may be determined using data collected from an accelerometer and any suitable inertial navigation algorithm. If the sensor cascading microdriver determines 128 the computing system has travelled a distance that exceeds a threshold, the process flow continues at block 410. If the sensor cascading microdriver determines 128 the computing system has not travelled a distance that exceeds a threshold, the process flow continues at block 412.

At block 410, the sensor cascading microdriver 128 provides power to a global positioning system (also referred to herein as GPS) sensor. In some embodiments, the GPS sensor may consumer more power than other sensors, such as the accelerometer, gyrometer, magnetometer, or motion tracking sensor. The sensor cascading microdriver 128 can save power consumption by keeping the GPS sensor in an off state until the computing system has travelled a distance beyond a predetermined threshold.

At block 414, the sensor cascading microdriver 128 can determine if the location of the computing system has changed. A location, as referred to herein, can include any geographic reference point. For example, a location may refer to a city, a state, a county, a country, or a neighborhood, among others. In some embodiments, the GPS sensor can determine if the computing system has changed locations based on the coordinates of the location of the computing system and maps that indicate the coordinates for particular locations. If the location of the computing device has changed, the process flow continues at block 416. At block 416, the sensor cascading microdriver 128 provides location data to an application. For example, some applications may be location aware. Therefore, the location aware applications may display data in response to the location of a computing system. In some examples, location aware applications may provide directions to a user, provide lists of surrounding businesses, or the like.

If the location of the computing system has not changed at block 414, the process flow continues at block 418. At block 418, the sensor cascading microdriver 128 determines if a timeout value for the GPS sensor has been exceeded. For example, the GPS sensor might not detect any change in location of the computing system for a period of time. If the computing system changes locations within a predetermined period of time, the process resets a timer at block 420 and the process flow continues at block 414. If the computing system does not change locations within a predetermined period of time, the process stops providing power to the GPS sensor at block 422. In some embodiments, the sensor cascading microdriver 128 can also continue at block 416 by providing data from the GPS sensor to an application.

After the sensor cascading microdriver 128 turns off power to the GPS sensor at block 422, the process flow continues at block 412. At block 412, the sensor cascading microdriver 128 determines if a timeout value for the gyrometer, magnetometer, or motion tracking sensor has been exceeded. For example, the gyrometer, magnetometer, or motion tracking sensor might not detect any change in state of the computing system for a period of time. A state of the computing system may include the tilt, velocity, or direction of the computing system, among others. If the computing system changes states within a predetermined period of time, the process resets a timer at block 424 and the process flow continues at block 408. If the computing system does not change states within a predetermined period of time, the process flow stops providing power to the gyrometer, magnetometer, or motion tracking sensors at block 426. At block 426, the accelerometer continues to receive power and can detect a movement to begin another iteration of the cascading power consumption process.

The process flow diagram of FIG. 4 is not intended to indicate that the steps of the method 400 are to be executed in any particular order, or that all of the steps of the method 400 are to be included in every case. Further, any number of additional steps may be included within the method 400, depending on the specific application.

Figure 5:
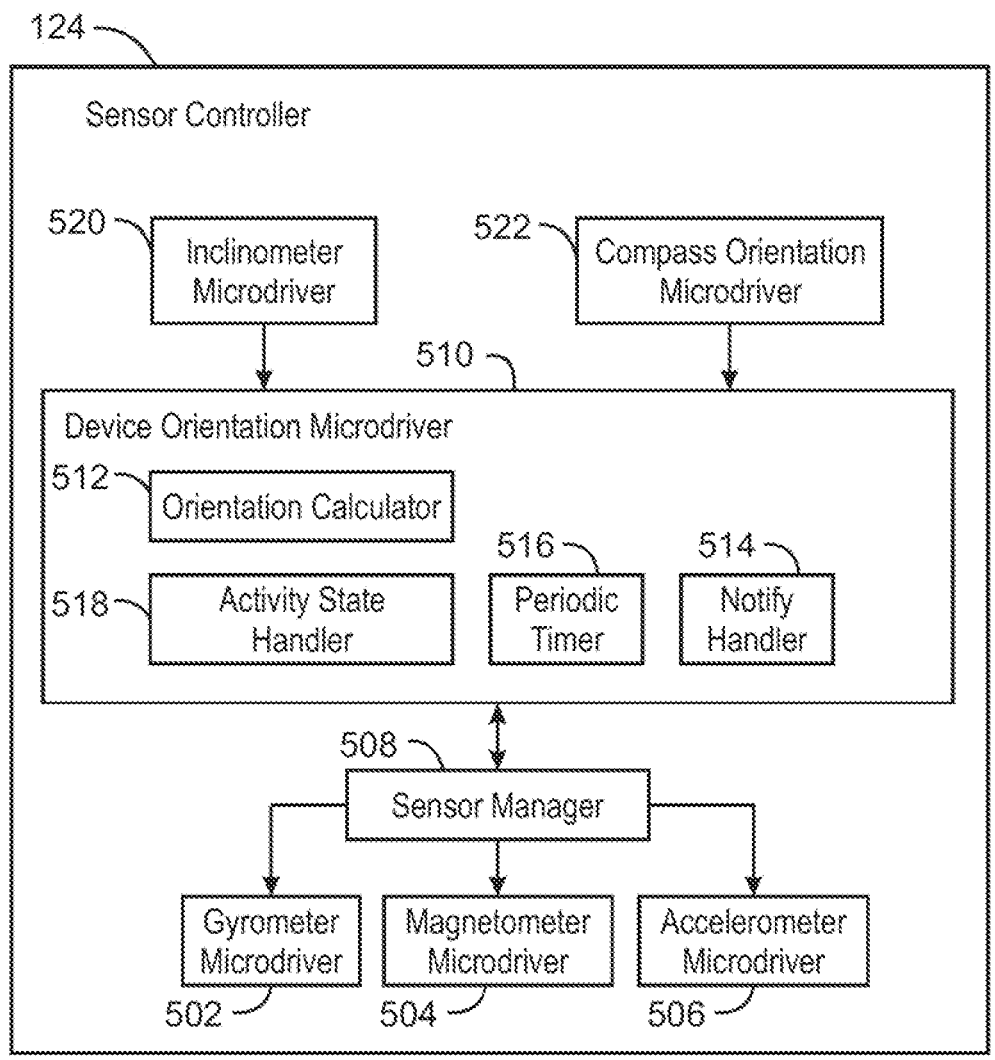
FIG. 5 is an example of a sensor controller hub that can cascade power consumption by sensors.

FIG. 5 is an example of a sensor controller hub that can cascade power consumption by sensors. The sensor controller hub 124 can be implemented in a computing system, such as computing system 100 of FIG. 1.

The gyrometer microdriver 502, magnetometer microdriver 504, and the accelerometer microdriver 506 can detect sensor data. For example, the gyrometer microdriver 502 can detect data related to the orientation of a computing device captured by a gyrometer. In some embodiments, the gyrometer microdriver 502 can detect angular velocities of a computing device. The magnetometer microdriver 504 can detect data related to the strength or direction of magnetic fields. In some embodiments, the magnetometer microdriver 504 can detect data from a magnetometer sensor. The accelerometer microdriver 506 can detect data related to the acceleration or change in velocity of a computing system. In some embodiments, the accelerometer microdriver 506 can detect data from an accelerometer sensor.

The sensor manager 508 can detect data from any suitable number of sensor microdrivers. In some embodiments, the sensor microdrivers may include a gyrometer microdriver 502, a magnetometer microdriver 504, and an accelerometer microdriver 506, among others. The sensor manager 508 can also send data from sensor microdrivers to a device orientation microdriver 510.

The device orientation microdriver 510 can cascade power consumption by sensors using an orientation calculator 512, a notification handler 514, a periodic timer 516, and an activity state handler 518. The orientation calculator 512 can detect and aggregate data from any suitable number of sensors. For example, a gyrometer, a magnetometer, and an accelerometer may each detect data for three axis, such as the X, Y, and Z axis. The orientation calculator 512 may aggregate the data from each axis for each sensor. In some embodiments, the orientation calculator 512 may detect data for any suitable number of axis.

The notification handler 514 can determine when data is detected from a sensor. For example, the notification handler 514 may detect when data is received from a gyrometer, a magnetometer, or an accelerometer. The periodic timer 516 can indicate a period of time that represents a timeout value. For example, the periodic timer 516 may store a time that represents a threshold for cascading power consumption by sensors.

The activity state handler 518 may detect the activity state of sensors and enable states that include cascading power consumption by sensors. For example, the activity state handler 518 may implement a low activity state in which accelerometer and magnetometer notifications are enabled at a reduced interval to save power consumption. In addition, notifications from a gyrometer may be disabled during the low activity state. The activity state handler 518 may also enable a high activity state. During a high activity state, notifications for the gyrometer, accelerometer, and magnetometer may be enabled at a regular interval, which is more frequent than the interval for the low activity state. The device orientation microdriver 510 can change a state from a high activity state to a low activity state when the notification handler 514 does not detect data for a period of time specified by the periodic timer 516. If the device orientation microdriver 510 enforces a low activity state and the notification handler 514 receives data from a sensor, the device orientation microdriver 510 can enable a high activity state through the activity state handler 518.

The inclinometer microdriver 520 and compass orientation microdriver 522 can detect data from the device orientation microdriver 510. In some embodiments, the inclinometer microdriver 520 and compass orientation microdriver 522 can use a combination of data from any suitable number of sensors to compute information. For example, the inclinometer microdriver 520 can measure angles of slope, tilt, or elevation of the computing device using aggregated data from multiple sensors. In some embodiments, the compass orientation microdriver 522 can detect cardinal directions in relation to the surface of the Earth. For example, the compass orientation microdriver 522 may aggregate data from multiple sensors to detect the cardinal direction of North, South, East, West, or any other cardinal direction.

Figure 6:
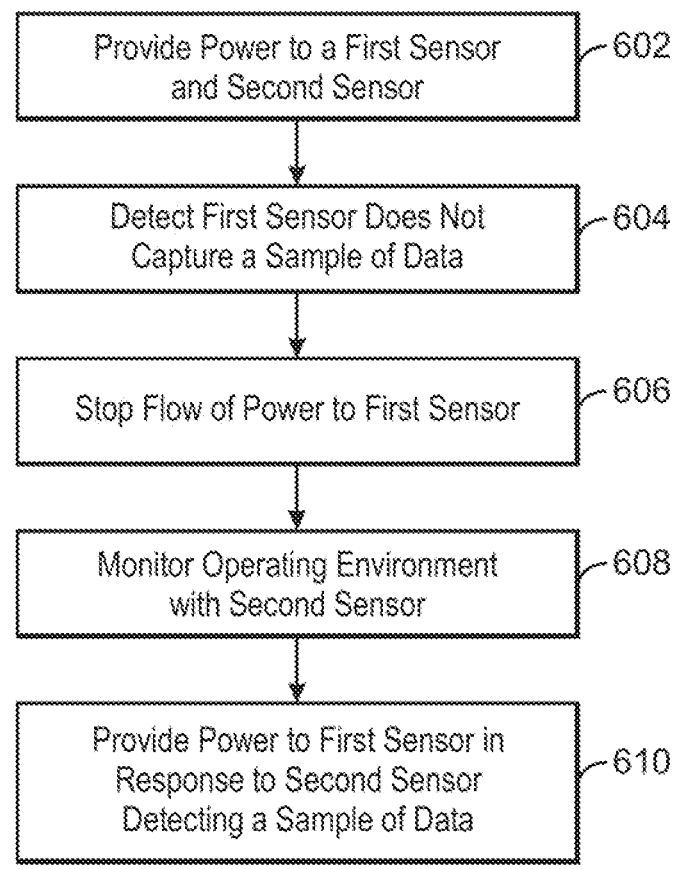
FIG. 6 is a process flow diagram for an example of cascading power consumption.

FIG. 6 is a process flow diagram for an example of cascading power consumption. The method 600 can be implemented with a computing system, such as computing system 100 of FIG. 1.

At block 602, the sensor cascading microdriver 128 can provide power o a first sensor and a second sensor. The first sensor and second sensor can include any type of sensor such as a gyrometer, an accelerometer, or a magnetometer, among others.

At block 604, the sensor cascading microdriver 128 can detect that a first sensor does not capture a sample of data. As discussed above, the sample of data can include any information related to the operating environment of the computing device. For example, the sample of data may indicate the tilt, direction, or velocity, among others, of the computing device. In some embodiments, the sensor cascading microdriver 128 may establish a timeout value that indicates a period of time during which a first sensor does not capture a sample of data. In some examples, the timeout value may indicate a period of inactivity.

At block 606, the sensor cascading microdriver 128 can stop the flow of power to a first sensor. In some embodiments, the first sensor may consumer more power than the second sensor. The sensor cascading microdriver 128 can save power consumption by stopping the flow of power to the first sensor.

At block 608, the sensor cascading microdriver 128 can monitor the operating environment with the second sensor. In some embodiments, monitoring the operating environment with the second sensor can save power consumption because the first sensor may consumer more power than the second sensor.

At block 610, the sensor cascading microdriver 128 can provide power to the first sensor in response to the second sensor detecting a sample of data. The sensor cascading microdriver 128 may continue to monitor the first sensor to detect for additional periods of inactivity and stop the flow of power to the first sensor if inactivity is detected.

The process flow diagram of FIG. 6 is not intended to indicate that the steps of the method 600 are to be executed in any particular order, or that all of the steps of the method 600 are to be included in every case. Further, any number of additional steps may be included within the method 600, depending on the specific application.

Figure 7:
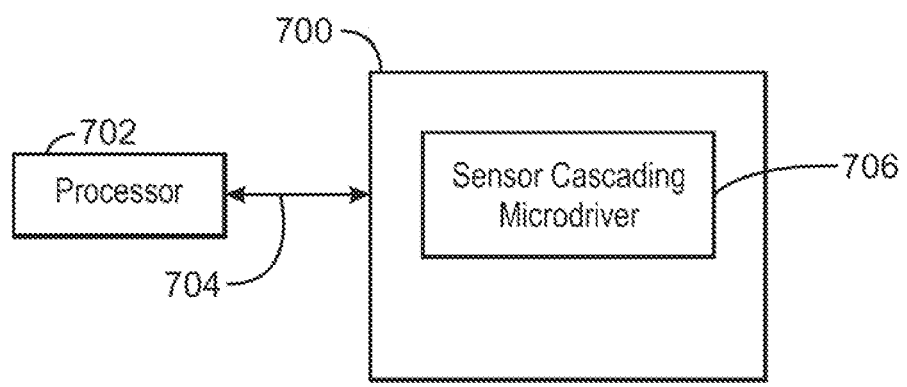
FIG. 7 is a tangible, non-transitory computer-readable medium that can cascade power consumption by sensors.

FIG. 7 is a block diagram showing a tangible, non-transitory, computer-readable medium 700 that can cascade power consumption by sensors. The tangible, non-transitory, computer-readable medium 700 may be accessed by a processor 702 over a computer bus 704. Furthermore, the tangible, non-transitory, computer-readable medium 700 may include code to direct the processor 702 to perform the steps of the current method.

The various software components discussed herein may be stored on the tangible, non-transitory, computer-readable medium 700, as indicated in FIG. 7. For example, a sensor cascading microdriver 706 may be adapted to direct the processor 702 to cascade power consumption by any suitable number of sensors. It is to be understood that any number of additional software components not shown in FIG. 7 may be included within the tangible, non-transitory, computer-readable medium 700, depending on the specific application.

EXAMPLE 1

A method for cascading power consumption is described herein. The method includes providing power to a first sensor and a second sensor, wherein the first sensor consumes more power than the second sensor. The method also includes detecting the first sensor does not capture a sample of data. Furthermore, the method includes stopping the flow of power to the first sensor. In addition, the method includes monitoring an operating environment with the second sensor. The method also includes providing power to the first sensor in response to the second sensor detecting a sample of data.

In some embodiments, the first sensor or the second sensor can be comprised of any number of sensors. In some examples, the first sensor or the second sensor can include a gyrometer, a magnetometer, or an accelerometer, among others In some examples, power consumption can be cascaded between any suitable number of sensors. Additionally, power consumption may also be cascaded between sensors, applications, and hardware devices, among others.

EXAMPLE 2

A system for cascading power consumption is described herein The system includes a first sensor for detecting an environmental characteristic, a second sensor for detecting an environmental characteristic, a processor to execute computer-readable instructions, and a storage device to store computer readable instructions. The computer-readable instructions can direct the processor to provide power to the first sensor, and the second sensor, wherein the first sensor consumes more power than the second sensor. The computer-readable instructions can also direct the processor to detect that the first sensor does not capture a sample of data. In addition the computer-readable instructions can direct the processor to stop the flow of power to the first sensor and monitor an operating environment with the second sensor. Furthermore, the computer-readable instructions can direct the processor to provide power to the first sensor in response to the second sensor detecting a sample of data.

In some embodiments, the system may also include a camera. In some examples, power consumption to the camera can be stopped based on whether a first sensor or a second sensor captures a sample of data. In addition, the system may also start and stop the execution of an application based on whether a first sensor or a second sensor captures a sample of data.

EXAMPLE 3

At least one machine readable medium comprising a plurality of instructions for cascading power consumption is described herein. The instructions cause a computing device to provide power to a first sensor, and a second sensor, wherein the first sensor consumes more power than the second sensor. The instructions also cause a computing device to detect the first sensor does not capture a sample of data. In addition, the instructions also cause the computing device to stop the flow of power to the first sensor. Furthermore, the instructions cause the computing device to monitor an operating environment with the second sensor and provide power to the first sensor in response to the second sensor detecting a sample of data.

In some embodiments, the sample of data comprises an indication that a sensor has detected an environmental characteristic. The environmental characteristic can include a change in velocity of the computing system, a change in tilt of the computing system, a change in direction of the computing system, a change in the light of the surrounding area, among others. In some examples, the instructions can cause the computing device to execute location aware applications and facial recognition applications in response to a first sensor or a second sensor capturing a sample of data.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for cascading power consumption within a sensor controller comprising:
   providing power to a first set of sensors and a second sensor, wherein the first set of sensors consume more power than the second sensor, wherein the second sensor comprises an accelerometer and the first set of sensors comprise a magnetometer and a motion tracker;
   detecting the first set of sensors do not capture a sample of data;
   stopping the flow of power to the first set of sensors to reduce power consumption of the sensor controller;

detecting a low activity state and reducing a time interval at which the second sensor provides notifications indicating detected data;

monitoring an operating environment with the second sensor based on the reduced time interval;

providing power to the first set of sensors in response to the second sensor detecting a sample of data;

calculating a sample of data detected from the first set of sensors; and providing power to a third sensor in response to determining that a threshold distance based on the sample of data from the first set of sensors has been exceeded, wherein the third sensor comprises a global positioning system sensor.

2. The method of claim 1, wherein the sample of data comprises an indication that the second sensor has detected an environmental characteristic.

3. The method of claim 1, wherein the first set of sensors further comprises a gyrometer.

4. The method of claim 1, wherein a plurality of additional sensors receive power in response to the first set of sensors receiving power.

5. The method of claim 4, wherein the plurality of additional sensors comprise an infrared proximity sensor.

6. A system for cascading power consumption comprising:
a first set of sensors for detecting an environmental characteristic;
a second sensor for detecting an environmental characteristic;
a processor to execute computer-readable instructions; and
a storage device to store computer-readable instructions, the computer-readable instructions to direct a processor to:
provide power to the first set of sensors, and the second sensor, wherein the first sensor set of sensors consume more power than the second sensor, and wherein the second sensor comprises an accelerometer and the first set of sensors comprise a magnetometer and a motion tracker;
detect that the first set of sensors do not capture a sample of data;
stop the flow of power to the first set of sensors;
detect a low activity state and reduce a time interval at which the second sensor provides notifications indicating detected data;
monitor an operating environment with the second sensor based on the reduced time interval;
provide power to the first set of sensors in response to the second sensor detecting a sample of data;
calculate a sample of data detected from the first set of sensors;
provide power to a third sensor in response to determining that a threshold distance based on the sample of data from the first set of sensors has been exceeded, wherein the third sensor comprises a global positioning system sensor; and
provide location data detected from the third sensor to an application.

7. The system of claim 6, wherein the system comprises a camera that can detect the user.

8. The system of claim 6, wherein the sample of data comprises an indication that the second sensor has detected an environmental characteristic.

9. The system of claim 6, wherein the first set of sensors further comprises a gyrometer.

10. The system of claim 6, wherein a plurality of additional sensors receive power in response to the first set of sensors receiving power.

11. The system of claim 10, wherein the plurality of additional sensors comprise an infrared proximity sensor.

12. At least one non-transitory machine readable medium comprising a plurality of instructions that, in response to being executed on a computing device, cause the computing device to:
provide power to a first set of sensors, and a second sensor, wherein the first set of sensors consume more power than the second sensor, and wherein the second sensor comprises an accelerometer and the first set of sensors comprise a magnetometer and a motion tracker;
detect the first set of sensors do not capture a sample of data;
stop the flow of power to the first set of sensors;
detect a low activity state and reduce a time interval at which the second sensor provides notifications indicating detected data;
monitor an operating environment with the second sensor based on the reduced time interval;
provide power to the first set of sensors in response to the second sensor detecting a sample of data;
calculate a sample of data detected from the first set of sensors;
provide power to a third sensor in response to determining that a threshold distance based on the sample of data from the first set of sensors has been exceeded, wherein the third sensor comprises a global positioning system sensor; and
provide location data detected from the third sensor and an elevation of the computing device, measured based on the sample of data, to an application.

13. The non-transitory machine readable claim of 12, wherein the sample of data comprises an indication that the second sensor has detected an environmental characteristic.

14. The non-transitory machine readable claim of 12, wherein the first set of sensors further comprises a gyrometer.

15. The method of claim 1, comprising measuring a cardinal direction or elevation of the computing device based on the sample of data.

16. The method of claim 1, wherein the first set of sensors further comprises a camera and a human proximity sensor.

17. The method of claim 16, comprising stopping the flow of power to the camera in response to stopping execution of the application.

18. The method of claim 1, comprising providing the location data detected from the third sensor to an application.

* * * * *